UNITED STATES PATENT OFFICE.

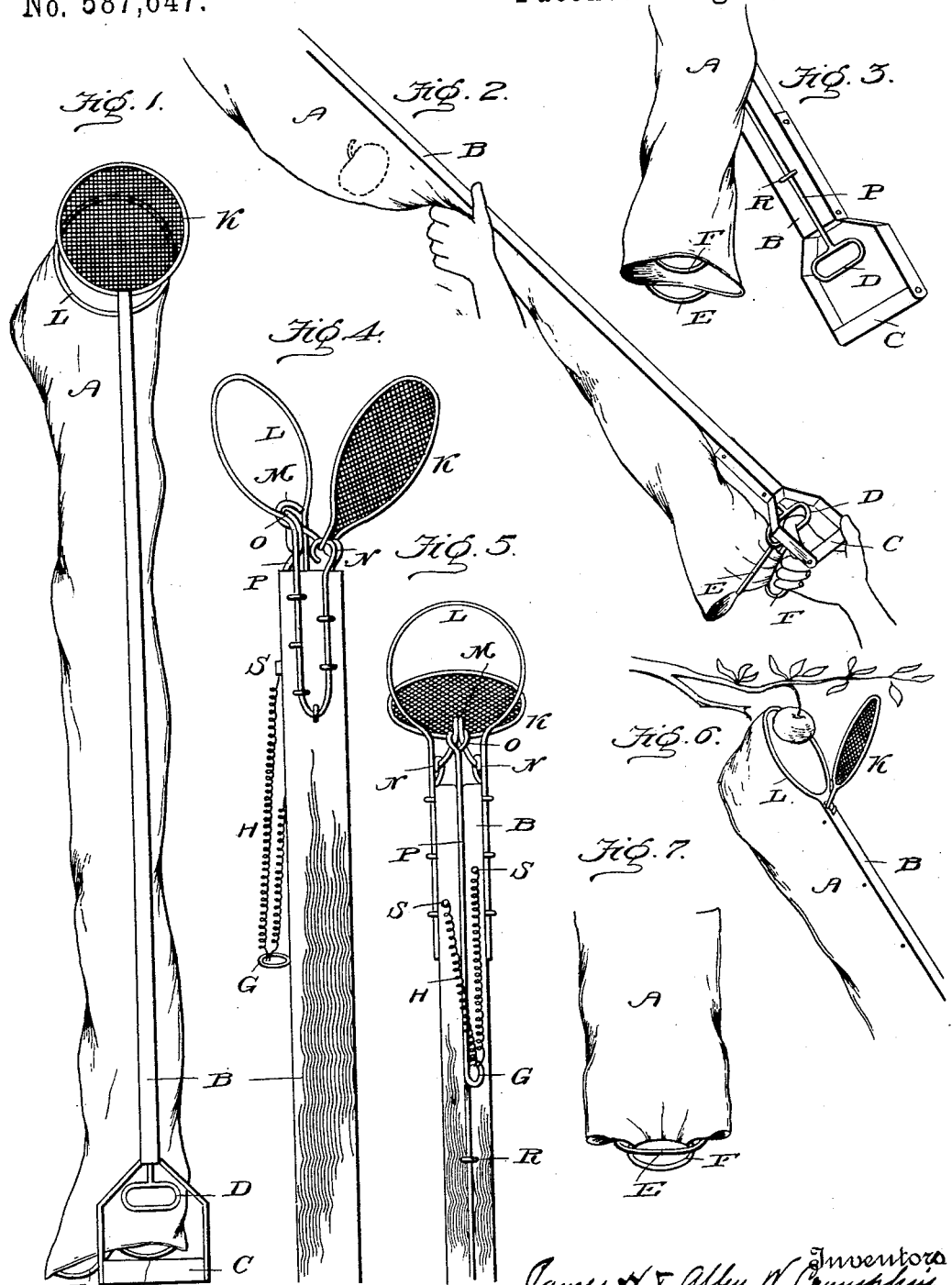

JAMES HOMER CRAMPHIN AND ALLEN WATKINS CRAMPHIN, OF LINCOLN, NEBRASKA.

FRUIT-PICKING MACHINE.

SPECIFICATION forming part of Letters Patent No. 587,647, dated August 3, 1897.

Application filed August 1, 1895. Serial No. 557,876. (No model.)

*To all whom it may concern:*

Be it known that we, JAMES HOMER CRAMPHIN and ALLEN WATKINS CRAMPHIN, citizens of the United States, residing at Lincoln, in the county of Lancaster and State of Nebraska, have invented a Fruit-Picking Machine, of which the following is a specification.

Our invention relates to a fruit-picking machine in which the fruit is received in a trap and from thence conducted to the hand through a flexible cylinder attached to a pole.

The objects of our invention are, first, to provide a means for picking fruit more rapidly and with greater ease than by hand; second, to enable the ripe fruit to be plucked without disturbing or in any way injuring that which is green; third, to enable the ripe fruit to be gathered without bruising or marring the same, and fourth, to prevent breaking the limbs or doing other damage to the fruit-trees during the process of fruit-gathering. We attain these objects by the mechanism illustrated in the accompanying drawings, in which—

Figure 1 is a front view of the entire machine. Fig. 2 shows the manner of holding and manipulating the machine; Fig. 3, a back view of the lower end of the machine; Fig. 4, a side view of the upper end of machine with the flexible cylinder removed; Fig. 5, a back view of the upper part of the machine with the flexible cylinder removed; Fig. 6, view showing the manner of plucking fruit; Fig. 7, view showing the manner of closing the lower end of the flexible cylinder.

Similar letters refer to similar parts throughout the several views.

The pole B may be said to constitute the framework of the machine. To the upper end of the pole B is attached the trap for gathering the fruit, which is constructed as follows: A stiff wire forms the loop L. Its ends then run a short distance down and up again on either side (both sides) of the upper end of the pole B, to which it is securely fastened. The ends of the wire are then turned to form small circles N N, which form part of the hinge on which loop K turns. Loop K is formed from a similar piece of wire, the ends of which are turned through the circles N N, meeting each other. They together turn outward between the wires supporting the loop L and after a short projection their ends are turned in the circle M. Loop K is covered with a screen or netting of wire or of other material, through which the fruit may be seen.

A wire P extends in a groove along the back of and the entire length of the pole B, where it is retained in place by small cross-bars R R, which allow it freedom of action. It terminates at the upper end in a loop O, which passes through the circle M. A short distance from the top it makes a complete turn to form the loop G. It then continues down the pole B and terminates at the lower end in the loop D. Through loop G a spring passes, the ends of which are turned upward and fastened to the pole B at the points S.

A flexible cylinder A is attached to the pole B all along its entire length except, if desired, a few inches at the bottom. The upper end is formed into a hood, the opening of which is securely fastened around the wire which forms loop L. Attached to the lower end of said cylinder, at opposite sides, are the large and small loops E and F, respectively. The pole B terminates at its lower end in a handle C.

In using the machine one hand grasps the pole B and the flexible cylinder A some distance above its lower end in such a manner as to completely close the channel in the said cylinder. The other hand grasps the handle C, some of the fingers passing through loop F, others through loop D, as is convenient, loop F having been passed through loop E, thus closing the end of cylinder A.

In gathering fruit (see Fig. 6) the mouth of the trap-loop L is placed under the fruit. By a downward motion of the finger in loop D the wire P pulls down loop M, which causes loop K to turn on the hinge at N N and close down over loop L, thus shutting the trap, the netting on loop K gently pressing the fruit into the hood beneath loop L. A gentle pull or twist will now detach it from the tree. The machine being held on an incline the fruit rolls down the flexible cylinder A to the point where it is grasped by the upper hand. If the hand is partly removed, the fruit passes gently down to the lower part of cylinder A, where it may or may not be allowed to accumulate, as is desired. The cylinder A can be readily opened while still holding the machine by removing the fingers from loop F.

What we claim, and desire to secure by Letters Patent of the United States, is—

In a fruit-picker, the combination with the pole having a loop L provided with arms that project downward on the opposite sides of the pole and thence upwardly and are formed with eyes, said arms being secured to said pole, of a loop K provided with a flexible covering and having arms that project through the aforesaid eyes and are formed into an eye M, a rod running parallel with the pole and connected to the eye M, springs H having one end connected to a loop G of the rod and their other ends connected to the pole, and a flexible cylinder connected to the loop L, and having attached to its lower end at opposite sides thereof large and small loops E and F respectively, substantially as shown and described.

JAMES HOMER CRAMPHIN.
ALLEN WATKINS CRAMPHIN.

Witnesses:
JOHN LOVE,
LEADORE I. RANDALL.